United States Patent [19]

Jaissle et al.

[11] Patent Number: 4,817,268
[45] Date of Patent: Apr. 4, 1989

[54] METHOD OF AND ARRANGEMENT FOR EXCHANGING TOOL HOLDERS IN WORKING UNITS FOR WORKING OF WORKPIECES

[75] Inventors: Hans-Ulrich Jaissle, Ludwigsburg; Manfred Hofmann, Moeglingen; Dietrich Geiger, Grossbottwar, all of Fed. Rep. of Germany

[73] Assignee: Hueller Hille GmbH, Ludwigsburg, Fed. Rep. of Germany

[21] Appl. No.: 17,899

[22] Filed: Feb. 24, 1987

Related U.S. Application Data

[62] Division of Ser. No. 637,533, Aug. 2, 1984, Pat. No. 4,646,421.

[30] Foreign Application Priority Data

Aug. 16, 1983 [DE] Fed. Rep. of Germany ..... 33295395

[51] Int. Cl.⁴ .................................. B23Q 3/157
[52] U.S. Cl. ........................... 29/568; 29/26 A; 29/426.1; 29/426.3; 408/35; 409/201; 414/744.4

[58] Field of Search .................. 29/426.1, 426.3, 428, 29/568, 559, 26 A; 414/744 R, 744 A, 590; 408/35; 409/201

[56] References Cited

U.S. PATENT DOCUMENTS

| | | | |
|---|---|---|---|
| 3,286,595 | 11/1966 | Wollenhaupt | 29/568 X |
| 3,760,472 | 9/1973 | Kielma et al. | 408/35 X |
| 4,216,572 | 8/1980 | Matsushita et al. | 29/26 A X |
| 4,318,665 | 3/1982 | Carroll et al. | 29/568 X |
| 4,354,306 | 10/1982 | Ida et al. | 29/568 |
| 4,428,256 | 1/1984 | Ida et al. | 29/568 X |

*Primary Examiner*—Howard N. Goldberg
*Assistant Examiner*—Frances Chin
*Attorney, Agent, or Firm*—Dick and Harris

[57] ABSTRACT

A method and arrangement for exchanging a variable number of tool holders in which only one tool holder at a time is brought into working position. The operations involved with accessing a variety of holders, one at a time, to a working position requires movement of minimum mass to the working position adjacent the drive unit—while one or more remaining tool holders are located in a series of accessible independent storage positions or in at least one storage magazine.

5 Claims, 12 Drawing Sheets

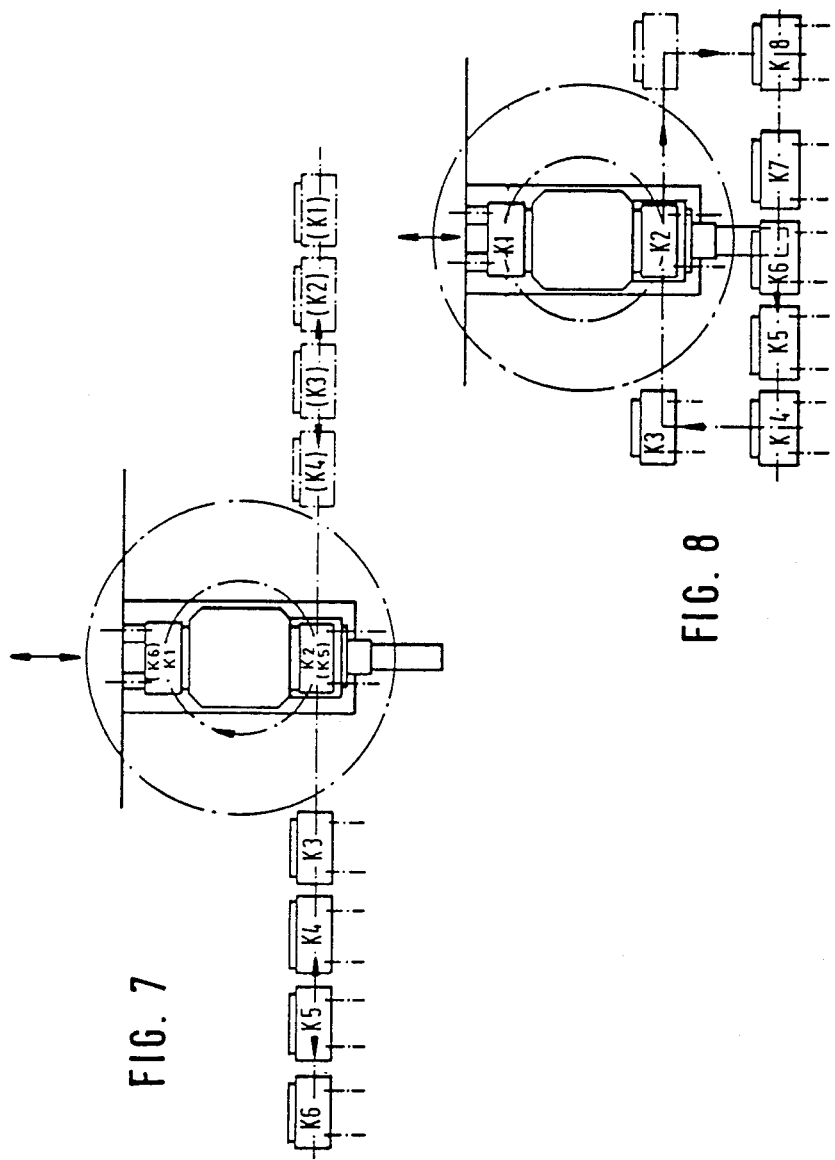

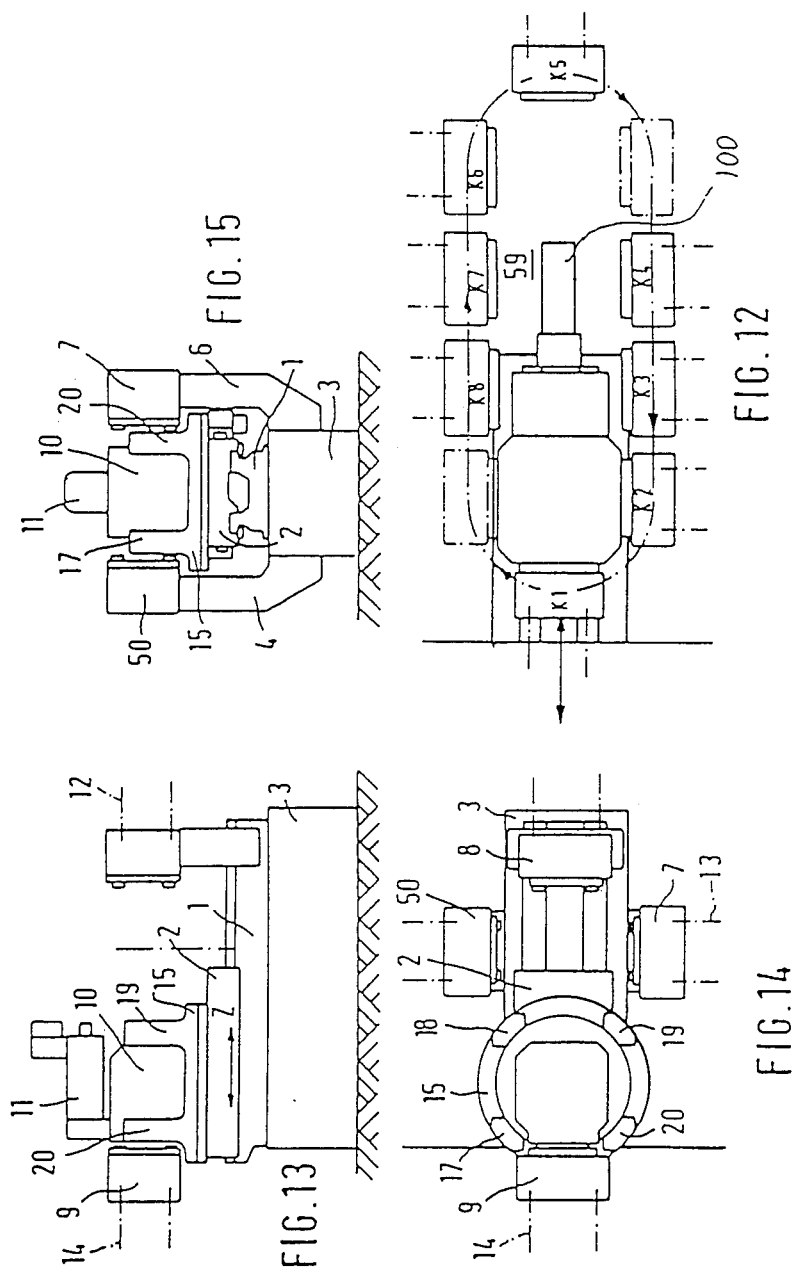

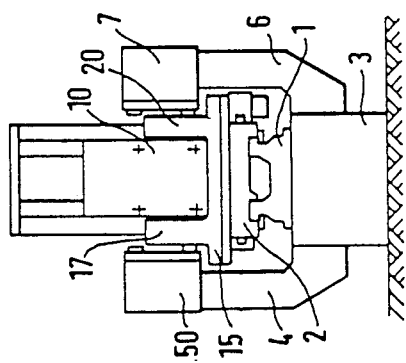
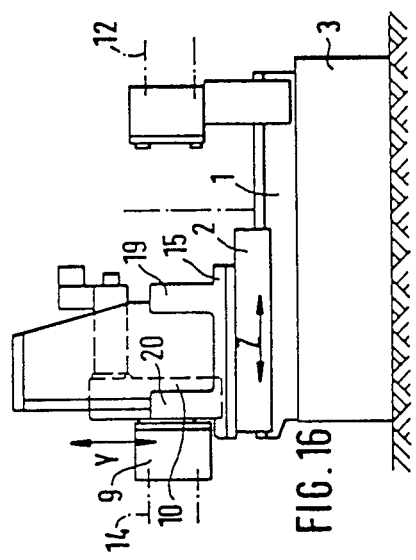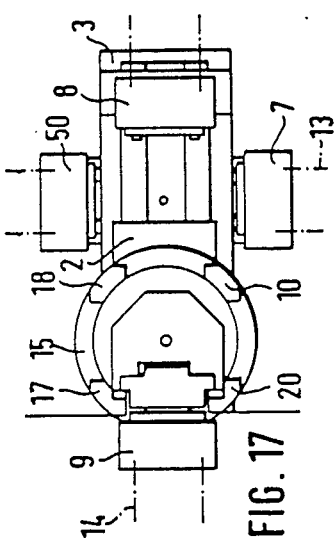

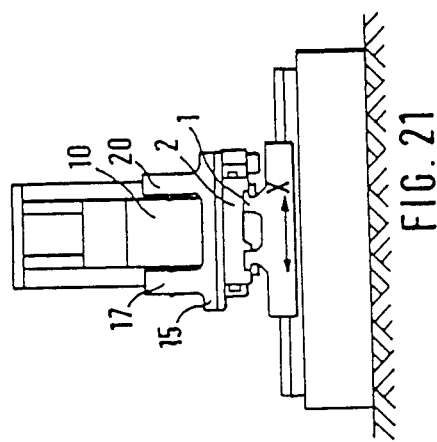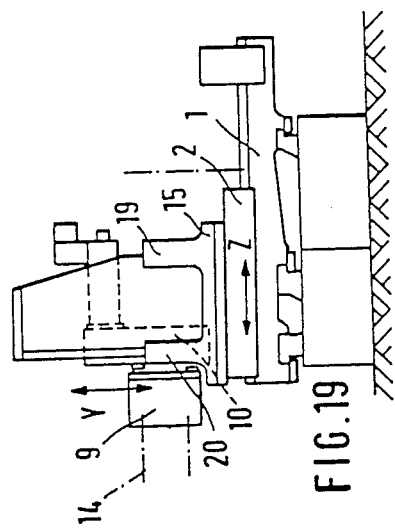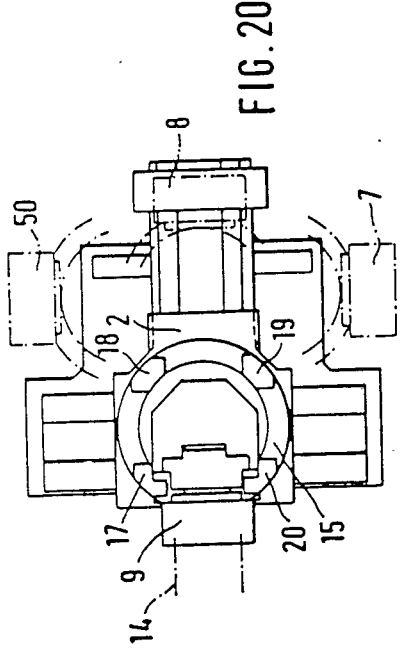

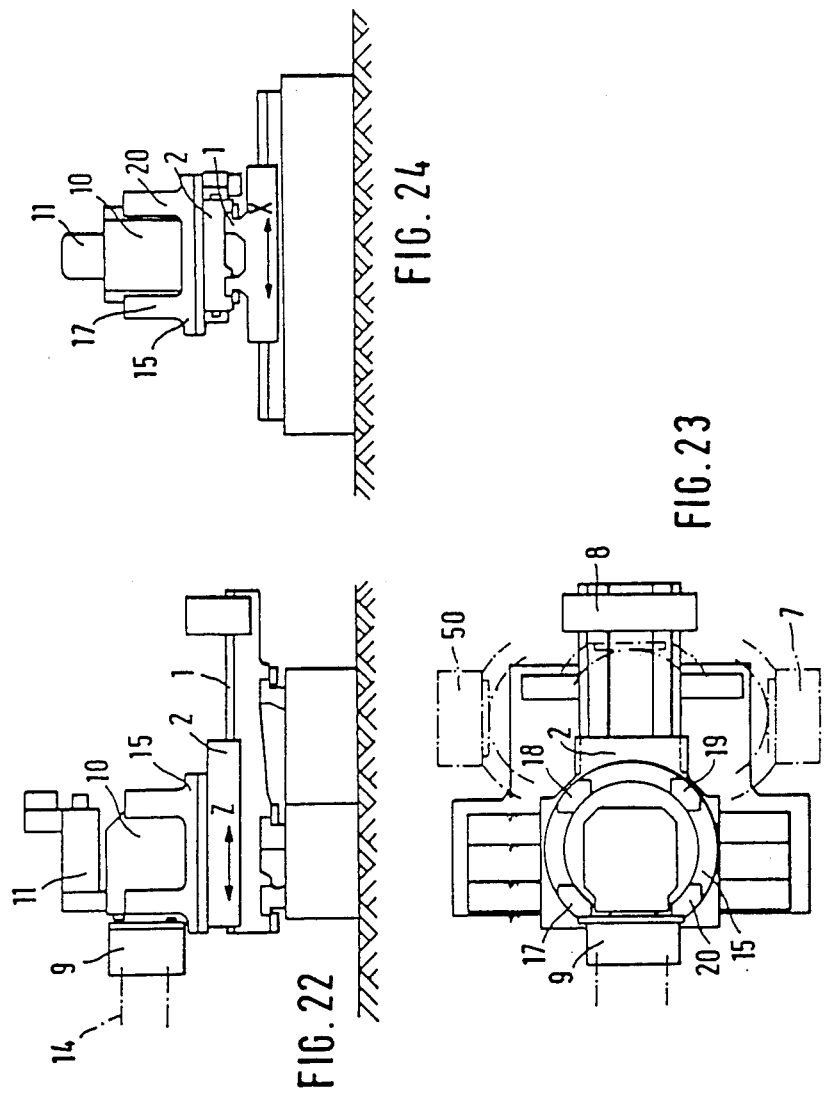

METHOD OF AND ARRANGEMENT FOR EXCHANGING TOOL HOLDERS IN WORKING UNITS FOR WORKING OF WORKPIECES

The present application is a divisional of parent application Ser. No. 06/637,533 filed Aug. 2, 1984, issuing as U.S. Pat. No. 4,646,421, on Mar. 2, 1987.

BACKGROUND OF THE INVENTION

The present invention relates to a method of and an arrangement for exchanging tool holders in a working unit for working of workpieces, in accordance with which a tool holder is removed from a working position and exchanged by another tool holder.

It is known to design a tool holder as polygonal receiving body with exchangeable units. This polygonal receiving body has at its lateral limiting faces a plurality of tool holders for receiving of tools. The receiving body is cyclically rotatable about a central axis so as to bring the respective tool holder to working position.

The disadvantage of this method and arrangement is that for bringing another receiving body with other tool holders to working position, the entire large, heavy and complicated receiving body with the tool holders must be dismounted from the working machine, transported back and deposited in a collector, thereafter another receiving body with tool holders must be transported to the working machine and mounted therein. Therefore, the entire mass of the receiving body with all tool holders must be transported back, when it is necessary to exchange the same by another receiving body with tool holders. The fitting period or dead time in this system is therefore relatively high.

Finally, the number of the tool holders mounted on the same receiving body, such as for example drilling heads, is structurally limited. Structurally, the receiving body must be placed with high accuracy in the working machine so that those tool holders which are located not in the working position must be positioned with high accuracy, which is also disadvantageous.

SUMMARY OF THE INVENTION

Accordingly, it is an object of the present invention to provide a method of, and an arrangement for exchanging tool holders in a working unit for working of workpieces which avoid the disadvantages of the prior art.

More particularly, it is an object of the present invention to provide a method in accordance with which on a working center or a working unit any number of tool holders can be held in ready position and without a great transporting path it is possible to provide unobjectionable and fast exchange of the tool holders, whereas always only the tool holder with its working tool is fixed, tensioned and coupled with the drive element with the required accuracy so that its tool is located in the required working position.

Still another object of the present invention is to provide an arrangement which performs the inventive method.

In keeping with these objects and with others which will become apparent hereinafter, one feature of the present invention resides, briefly stated, in a method which comprises the steps of:

maintaining, with one tool holder located in a working position, a further tool holder at a periphery of a predetermined shape in the region of a drive unit and/or at least one magazine in a ready position;

moving the tool holder located in the working position together with a drive unit in a rectilinear movement to the maintained tool holder;

uncoupling the tool holder located before in the working position from the driving unit drivingly and bodily and holding in this position, while further moving the driving unit to an end position and braking the same to its stoppage;

carrying out, after uncoupling of the tool holder and during the further movement of the drive unit or thereafter, the stroke of the uncoupled tool holder and the maintained tool holder relative to the drive unit;

after termination of the stroke movement, rotating the moved tool holder with a vertical axis of rotation so that the tool holder is brought in receiving position prior to the drive unit;

after termination of the rotary movement of the tool holder with the opposite stroke bringing the tool holder in a storage position; and moving the drive unit with opposite movement direction to the maintained tool holder in the receiving position and during further movement coupling, fixing and tensioning the same.

When the method is performed in accordance with the applicant's invention, only small masses must be moved during a quick and working step. Moreover, an access to any number of tool holders in the event of any great number of tool holders is provided.

An especial advantage of the inventive method is high speed of resetting of a tool holder to another tool holder. In one embodiment the resetting time of tool holder to another can be for example only five seconds or smaller, whereas the resetting can b attained without labor expenditures. The resetting is a time period during which another tool holder is brought to receiving position on the drive unit. It is possible, for example, to coat the tool holder and to perform the entire resetting automatically.

In addition to short auxiliary time and high material removal, also a labor-free shift is provided by the inventive method. The inventive method is suitable for all tool holders, such as for example multi-spindle drilling heads, milling heads, planning rotary heads, rotary heads, fine rotary heads with cutting correction, measuring heads, testing heads, angular milling heads and setting milling heads, deep drilling heads and others. The inventive method is not limited to a predetermined number of heads. The method can be NC-controlled.

In accordance with another feature of the present invention, an arrangement is proposed, comprising a carriage unit including a carriage guide and a carriage; a plurality of motor driven exchange tool holders; a drive unit for all tool holders and provided with a rotatable exchange ring for exchanging the tool holders, said drive unit with said rotatable exchange ring being movable together from a working position to a radial or negative position with said carriage on said carriage guide.

The inventive arrangement corresponds to the working purposes, workpiece spectrum and yearly production with different flexibility requirements. It is mountable and dismountable, which is true for both the machine and for its control and linkage. The inventive arrangement can be integrated as an individual machine or inside a link system or as a structural unit, for example, inside a transfer line.

In contrast to a so-called working center, the main conception of the inventive arrangement is that here is no individual spindle for exchanging different tools in the working unit. The complete tool holder is exchanged, whose design corresponds to the working task. For example, milling head with power support and rigid tool receiving element for cutter head. Or planning rotary head, wherein a spindle, planning rotary head, planning disc drive and path measurement are incorporated in this head. Also, individual spindle heads for automatic exchange of individual tools can be used in the inventive arrangement.

The tool holders can be exchangeable automatically inside a working cycle, or semi-automatically or manually during resetting, depending upon the respective requirements. There is no system limits to a certain number of tool holders. The exchange system is independent from the dimension of the tool holders and their number and is open or unlimited in this aspect. What is important is that in all cases it is characterized by short cutting time.

Good accesibility is also advantageous for the tool holder exchange as well as good accessibility for the maintenance.

Since always only one tool holder is located in the working position, energy and medium supply is required only for the tool holder located in the working position.

In general, the inventive arrangement can be built very compact, and it is possible to direct the arrangement during working in the X-axis and in the Y-axis. Moreover, in the inventive arrangement deep drilling operations, plane rotary operations and testing operations are possible.

In contrast to the prior art, the exchange system does not have any high accuracy requirements since only a predetermined tool holder in the working position is taken by the drive unit and coupled. Therefore, only in this position the required accuracy must be provided and not for the tool holder which is located in a storage position, for example around the drive unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 7 is a top plan view showing the working unit of the invention with an external tool holder accumulator;

FIG. 8 is a top plan view of an alternative embodiment of the invention employing a non-rotatable tool holder magazine;

FIG. 12 is a top plan view of an alternative embodiment of the invention utilizing a multitude of tool holder storage elements along the direction of reciprocation;

FIG. 13 is a side elevation of an alternative embodiment of the invention configured for working in the z-axis;

FIG. 14 is a top plan view of the apparatus according to FIG. 13;

FIG. 15 is an end elevation of the apparatus according to FIG. 13;

FIG. 16 is a side elevation of an alternative embodiment of the apparatus configured for working in the Y- and Z-axes;

FIG. 17 is a top plan view of the apparatus according to FIG. 16;

FIG. 18 is an end elevation of the apparatus according to FIG. 16;

FIG. 19 is a side elevation of an alternative embodiment of the invention configured for working in all three axes;

FIG. 20 is a top plan view of the invention according to FIG. 19;

FIG. 21 is an end elevation of the apparatus according to FIG. 20;

FIG. 22 is a side elevation of an alternative embodiment of the invention configured for working in the X and Z-axes;

FIG. 23 is a top plan view of the apparatus according to FIG. 22;

FIG. 24 is an end elevation of the apparatus according to FIG. 22;

DESCRIPTION OF PREFERRED EMBODIMENTS

Figure 1:
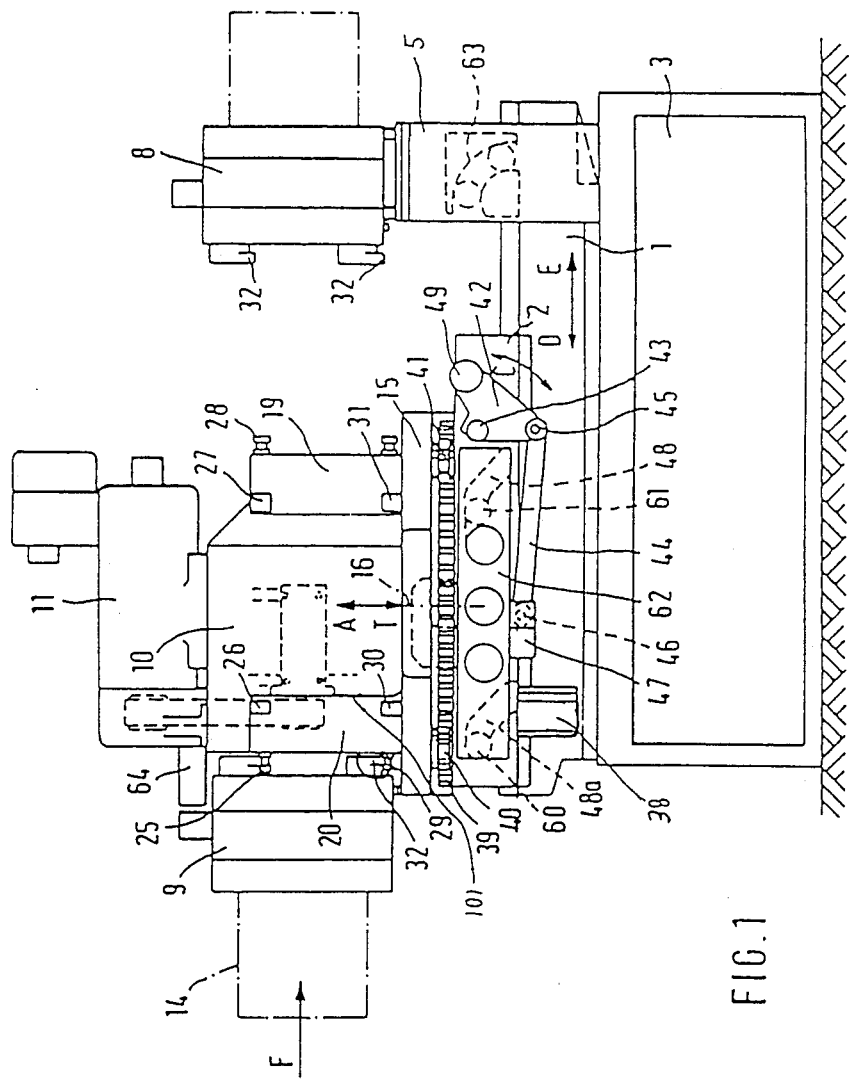
FIG. 1 is side view of a working unit in accordance with the present invention.
Figure 2:
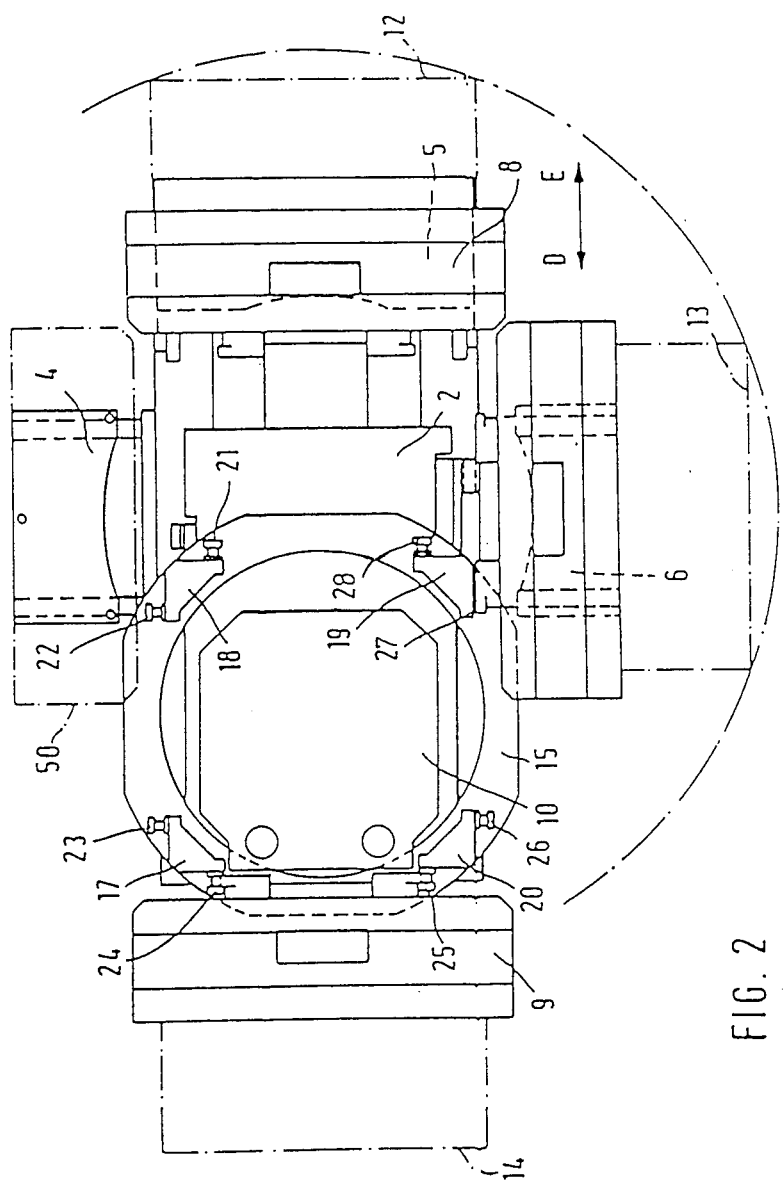
FIG. 2 is a plan view of the working unit of FIG. 1.
Figure 3:
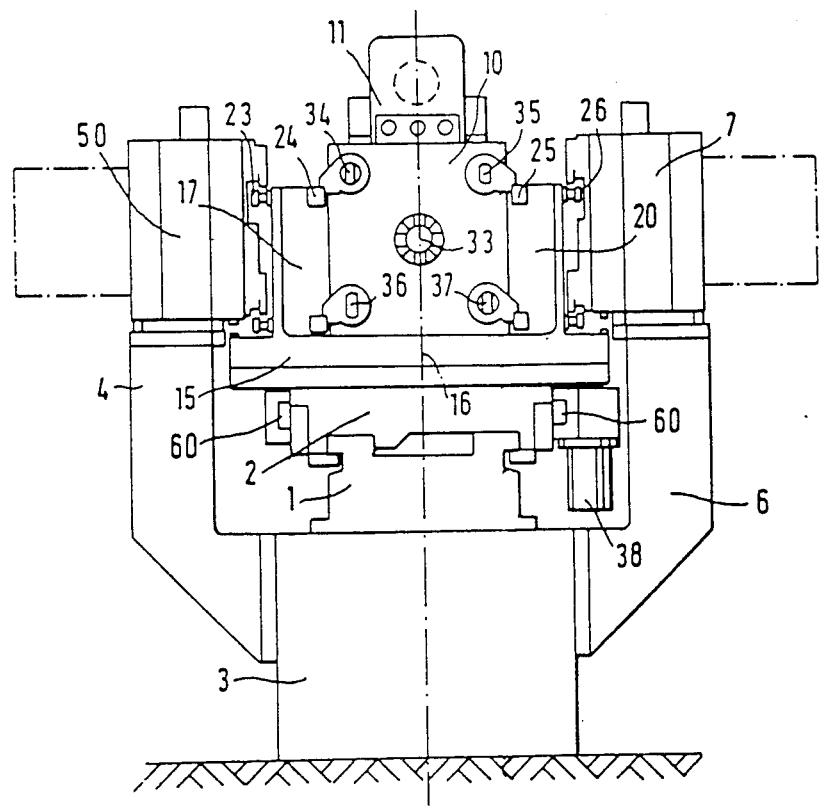
FIG. 3 is a front view in direction of arrow D of the working unit of FIG. 1.

In the embodiments of FIGS. 1-3 a horizontally arranged carriage guide is identified with reference numeral 1 and guides a carriage 2 which moves longitudinally in directions D or E, as directed by carriage motor means, such as motor 100 shown in FIG. 12. The carriage guide 1 and the carriage 2 form together a carriage unit. An auxiliary carriage is identified with reference numeral 62 and moves relative to the carriage 2 in its longitudinal direction.

FIG. 3 identifies in this embodiment a stationary base 3 on which the carriage guide 1 is arranged.

Reference numerals 4, 5 and 6 identify three tool holder storage elements arranged on or about base 3. As can be seen from FIG. 2, the tool holder storage element 5 is arranged at one end region of the carriage guide 1 whereas each of the tool holder storage elements 4 and 6 are arranged diametrically opposite to one another at opposite sides of the carriage guide 1, and more particularly outside of the normal projection of the carriage 2 but in the immediate proximity to the latter.

In the embodiment of FIGS. 1—3, tool holders 8 and 7 are arranged on the tool holder storage element 5 and on the tool holder storage element 6 respectively, whereas no tool holder is arranged on the tool holder storage element 4 in this embodiment, as can be seen from FIG. 2. However, here also, a tool holder 50 can be arranged.

A further tool holder 9 is located in a working position in a drive unit 10 which in this embodiment is associated with a direct current drive motor 11. The tool holder 9 and the drive unit 10 with the direct current drive 11 together form a movable group.

Dash-dot lines show in the embodiment of FIGS. 1—3 respective tools which are identified with reference numerals 12, 13 and 14. These tools can be, for example, drills or mills. Any desirable number of such tools can be provided, so that the tool holders 7, 8, 9 and 50 can be formed as multiple spindle heads, for example, multiple-spindle drilling heads. It also can be seen from the drawing that the tool holders 7, 8, 9, 50 are block-shaped and formed as exchangeable structural units which have in the plan view a substantially rectangular shape. They can also be, for example, square, cubical or of any other shape, for example, polygonal.

A rotatable exchange ring 15 with a vertical axis of rotation 16 is arranged under the drive unit 10 and the tool holders 7, 8, 9 and 50. The exchange ring 15 has in the embodiment of FIGS. 1-3, mounting holders 17, 18, 19 and 20 which are integrated structurally to it, to extend upwardly in a direction parallel to the axis of rotation 16. In this embodiment the mounting holder 17, 18, 19 and 20 have a somewhat triangular shape in the plan view and extend substantially to the outer edge of the drive unit 10. The mounting holders 17, 18, 19 and 20 have mounting couplings which lie in planes offset from one another by 90° and extending outwardly. The couplings are provided with reference numerals 21–31. It can be clearly seen from FIGS. 1-3 that several couplings in pairs are arranged in different height regions on each mounting holder 17, 18, 19.

The mounting couplings 21–31 are arranged in correspondence with suitable abutments which are provided on the tool holders 7, 8, 9 and 50. For better visibility in FIG. 1 only the abutment 32 is shown from all abutments. The remaining abutments of the tool holders can be formed correspondingly so that they can be brought into engagement with the associated mounting couplings 21–31, or out of engagement with the same by sliding under the couplings and into them upon raising.

As can be seen from FIG. 3, the drive units 10 has a central energy supply, such as drive shaft 33 through which the respective tool holder located in the working position, namely the tool holder 9 and its tool 14, are supplied with the drive energy. Moreover the drive unit 10 has mounting and clamping elements 34, 35, 36 and 37, which clamping elements fit into apertures 132 (FIGS. 25 & 26) in the tool holder when located in the work position to grasp it and tension it against the platen surface of drive unit 10. The tool holder which is in the working position such as 9 is thereby fixed, tensioned and driven.

Reference numeral 38 identifies a motor drive for the exchange ring 15. The motor drive 38 drives a pinion which is not shown in detail and engages with a toothed rim 39 formed of one piece with the exchange ring 15, so that the exchange ring 15 can be driven in both rotary directions unlimitedly.

The exchange ring 15 is guided at its periphery by rollers which, in this embodiment, have vertical axes of rotation. In FIG. 1, rollers 40 and 41 are shown. Several such rollers can be arranged one near the other at the periphery of the exchange ring 15.

Reference numeral 42 identifies in FIG. 1 an angular lever with one lever arm supported over an axle 43 on the carriage 2 turnable in a vertical plane. A coupling rod 44 is coupled with the angular lever 42 via an axle 45 also turnable in a vertical plane. The coupling rod 44 is connected, at its end facing away from the angular lever 42 via a turning axle 46 with a coupling 47. The latter is associated with the auxiliary carriage 62.

In the embodiment shown in FIGS. 1-3, the angular lever 42, the coupling rod 44, the turning axle 46 and a coupling 47, which together form an arrangement is provided only on one side of the device. It is, however, possible to provide such a device at the other side of the arrangement.

A roller arranged at an end of the angular lever 42 and extending beyond the carriage 2 is identified with reference numeral 49. Guiding grooves 48 and 48a trace with inclination of 45°. They are arranged at both sides of the auxiliary carriage 62 and engage at each side of the arrangement with curved rollers arranged on the carriage 2. FIG. 1 shows only the curved rollers 60 and 61. Reference numeral 63 identifies a downwardly curved control curve in tool storage element 5, with an increased inlet in which the roller 49 can run.

The angular lever 42 allows, together with the control curve 63 and the guide curve 48, 48a, a receipt or movement of one or another of the tool holders to the drive unit 10 or storing of the tool holders at the tool storage elements, through the aid of the rotatable exchange ring 15. When the roller 49 runs into the control curve 63 of the tool storage element, it is turned down when it reaches the downwardly curved part, whereby the auxiliary carriage 62 is displaced upwardly and outwardly from the storage element via the angular lever 42, the coupling rod 44, opposite to the movement direction E, and relative to the carriage 2. Outward prompting and elevation of the auxiliary carriage and, in turn, the exchange ring, thus relocates the exchange ring 15 out of its locked position relative to drive unit 10 and platen surface 101, enabling its rotation. When relowered, for reciprocating movement of the auxiliary carriage to and in the work position, exchange ring 15 is immobilized due to its withdrawn position, in which triangular mounting holders 17 and 20 are locked about the face 101 of drive unit 10, as shown in FIG. 2. For the horizontal curved portion, first horizontal movement of the exchange ring 15 takes place, whereas during reaching the inclined curve part of the guiding grooves 48, 48a, the exchange ring moves in direction A. The arrangement is so designed that by running into the inclined curved part which in this embodiment extends under 45° the exchange ring 15 remains immovable relative to the tool element storage stations for the tool holders until lifted and shifted forward. Since the exchange ring is released for rotation when prompted upwardly by the tool storage element or a tool storage magazine, after "picking up" the tool holder at this location, it then rotates whichever tool holder is to be positioned to the platen face 101 of drive unit 10, while still located at the tool storage location, after which the selected tool holder can be longitudinally slid to the work location.

The operation of the embodiment of FIGS. 1-3 is as follows:

For making the operation of the embodiment shown in FIGS. 1-3 clear it is accepted that a tool holder which is shown in dash-dot lines and identified with reference numeral 50 rests on the tool holder storage element 4.

The initial position for the operation is shown in FIG. in which the tool holder 9 is located in its working position.

For exchange of the tool holder 9, the following sequence of operations is performed:

1. The tool holders 50, 8 and 7 are located in their storing positions on the tool holder storage elements 4, 5 and 6, respectively, with tool holder 9 buttressed, i.e. tensioned and coupled, against drive unit 10, in a work position.

2. The carriage tool and the auxiliary carriage 62 are withdrawn back by motor 100 in direction E in FIG. 1 with the tool holder 9, the drive unit 10, and the exchange ring 15.

3. Prior to reaching the end position, apertures 132 of tool holder 9 are automatically uncoupled from clamping elements 34 through 37 of the drive unit 10 and resupported by the mounting supports 17-20 of the exchange ring 15. During movement of the carriage 2 in direction E, the roller 49 runs in the control curve 63, whereby the angular lever 42 is turned downwardly in direction C of FIG. 1. This results in a respective displacement of the coupling rod 44 in direction D and thereby in respective displacement of the auxiliary carriage 62 in direction D. Since the auxiliary carriage 62 is coupled with the exchange ring 15, these movements are so determined relative to one another that the exchange ring 15 remains immovable to movement of the carriage 2 so as to move out of its restrained, nonrotatable position relative to drive unit face 101. Subsequently, the exchange ring 15 is lifted in direction A, whereby the couplings, such as coupling 28, first slide under abutment 32 and lock into place thereunder as coupling 28 lifts abutment 32 upwardly with exchange ring 15 and the associated mounting holder during its stroke A, lifting the tool holder 8 located in storing position on the tool holder storage element 5, via the couplings 27 and 28, and lifts it so that the tool holder 8 is released from its tool holder storage element 5. Through such structure the tool holders are carried by the mounting supports of the exchange ring primarily by gravity. The side positioned tool holders 7 and 50 can be simultaneously lifted and removed, in equivalent fashion, from storage elements 6 and 4 respectively.

4. Then the exchange ring 15, including tool holders 7, 8, 9 and 50, is rotated by motor by 90° while in the upwardly shifted, forwardly displaced ring position.

5. After this the carriage 2 is moved by motor in direction D, and the exchange ring is lowered and fixed during this movement as it travels in direction D of the carriage 2. For example, the tool holders 7, 8, 9 are deposited on the tool holder storage elements 4, 5 and 6 whereas the tool holder 50 is lowered for taking up. In a further forward movement of the carriage 2 with the exchange ring 15 in direction D, the tool holder 50 is taken from the drive unit 10, or in other words, fixed, tensioned and coupled. Thus, the tool holder 50 can be relocated, through rotation, to its working position, proximate to the forward side of drive unit 10. As mentioned hereinabove, this procedure can be operatively orchestrated by conventional NC controls.

In the embodiment of FIGS. 4-12 the parts which perform the same functions are identified with the same reference numerals as in the first embodiment.

Figure 6:
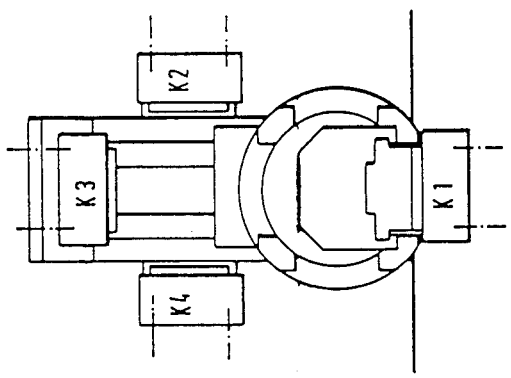
FIG. 6 is a top plan view of the apparatus according to FIG. 5, showing the working unit in the working position.
Figure 5:
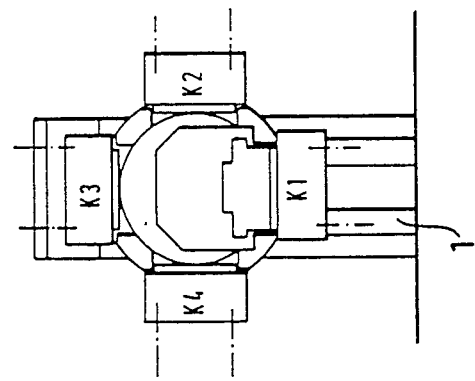
FIG. 5 is a further top plan view of the apparatus according to FIG. 4 in which the tool holders are lowered onto their respective storage elements.
Figure 4:
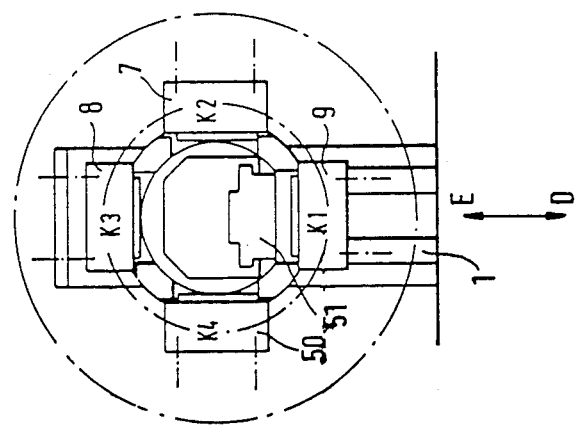
FIG. 4. is a top plan view of an embodiment of the invention showing turning positions and is configured for working in the Y-axis.

The embodiments of FIGS. 4-6 differ from the embodiment of FIG. 1 substantially in that this arrangement in addition provides for working in the Y-axis. For this purpose a vertical guide 51 is associated with the drive unit 10. FIG. 4 shows the turning position, wherein it can be seen that the working unit including the carriage 2 and the drive unit 10, is advanced in direction D relative to the exchange ring 15 by for example 100 mm. Then the tool holders 7, 8, and 50 are lowered on their tool holder storage elements 4, 5 and 6, (FIG. 5) as the raising-forward prompting mechanism is released from the rear tool storage element, whereas the tool holder 9 is taken from the drive unit 10, in other words fixed, tensioned and coupled.

FIG. 6 illustrates the working position in which the working unit including the carriage 2, the exchange ring 15, the drive unit 10, the drive 11 and the tool holder 9 is moved further forwardly, in its lowered position, in direction D.

Both the embodiment of FIGS. 1-3 and the embodiment of FIGS. 4-6 can be extended by an external tool holder accumulator in the region of the arrangement.

In the embodiment of FIGS. 7-12, a so-called head magazine is provided in which further tool holders are stored in ready-to-use condition. For example, the embodiment of FIG. 7 shows the extension of the magazine which for an additional tool holder two additional magazines places are required, one at the left side and another at the right side.

The individual working heads or tool holders are identified in FIG. 7 with reference numerals k1-k6.

Figure 9:
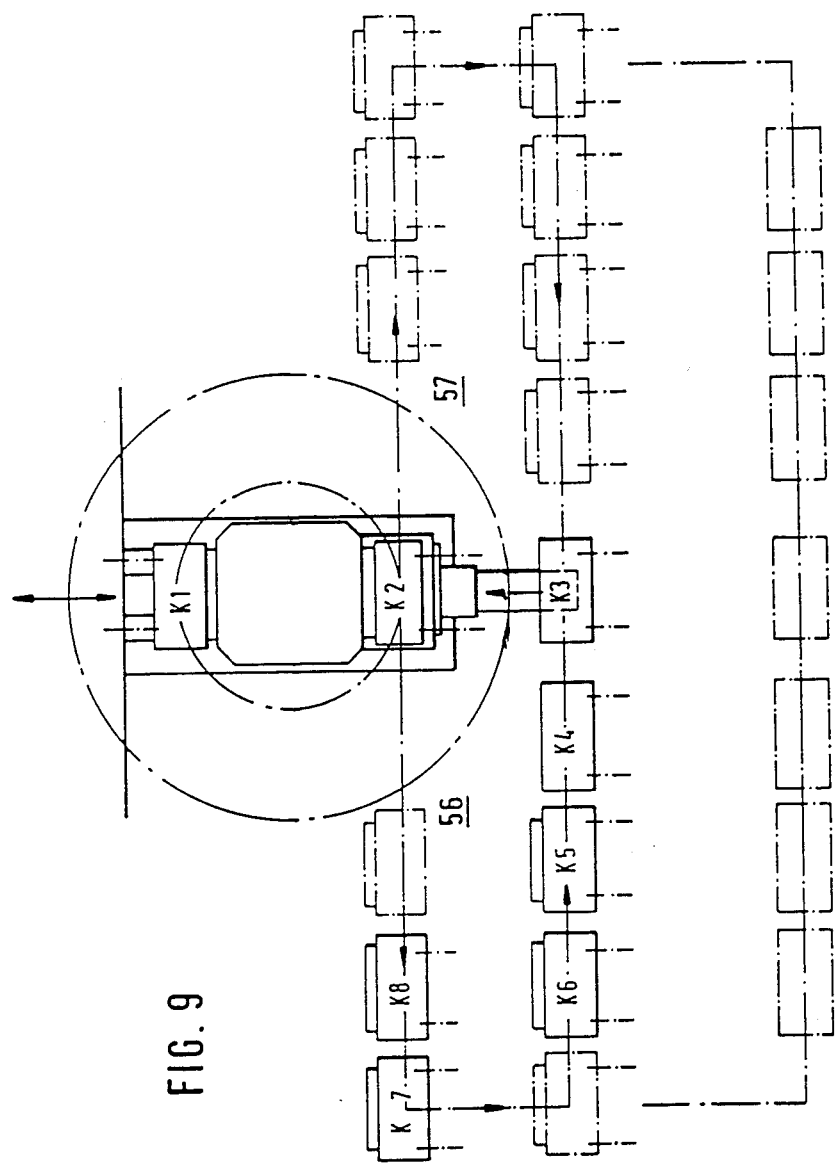
FIG. 9 is a top plan view of the apparatus according to FIG. 8, in association with an extended non-rotatable with an extended non-rotatable tool holder magazine.

In the embodiments of FIGS. 8 and 9, with a nonrotatable tool holder magazine, the tool holders or tool heads are also identified with reference numerals k1-k8.

Figures 10, 11:
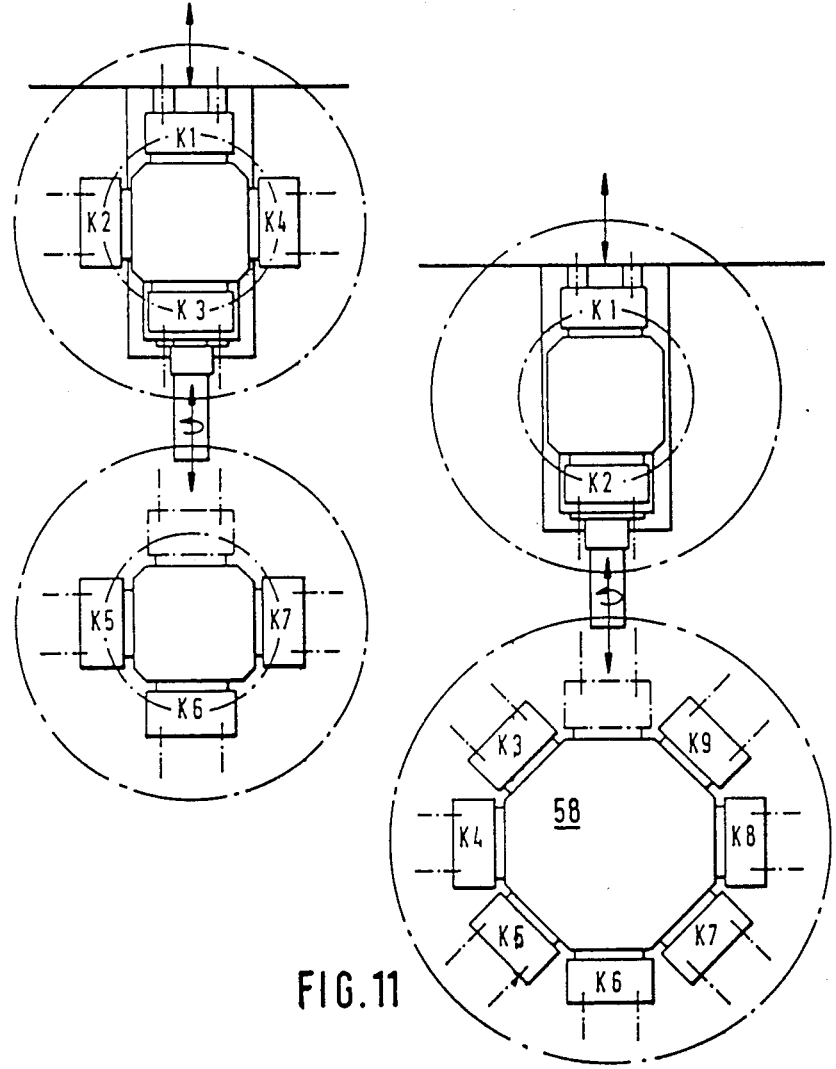
FIG. 10 is a top plan view of two apparatus according to FIG. 2 cooperatively interconnected.
FIG. 11 is a top plan view of an alternative embodiment of the apparatus showing a rotatable octagonal magazine in association with a working unit according to FIG. 7.

In the embodiment of FIG. 10, two arrangements corresponding to the arrangement of FIG. 2 are chained with one another. The tool holders are again identified with reference numerals k1-k7.

The embodiment of FIG. 8 shows also a variant with an external accumulator in the region of the arrangement, whereas the tool holders are again identified with reference numerals k1-k8.

FIG. 9 shows an embodiment in which magazines 56 and 57 are provided, wherein the magazine 56 is an idle plate and the magazine has several idle plates.

In the embodiment of FIG. 11 a rotatable magazine 58 is arranged in an inventive arrangement, and several tool holders k3-k9 are held ready to use in it, whereas the tool holders k1 and k2 are located on an arrangement which has a working position and a storing position. For example, as shown in FIG. 11, tool holder K1 is in the working position and tool holder K2 is in the storing position. If it were desired to store tool holder K2 and put tool holder K3 into working position, the following steps would take place. The carriage bearing tool holder K2 would drive tool holder K2 to the vacant storage position shown by the phantom lines in FIG. 11. Once tool holder K2 is stored in that previously vacant position, magazine 58 rotates until tool holder K3 is opposite the just vacated carriage, which couples with tool holder K3, and draws it into the storing position formerly occupied by tool holder K2. The exchange ring then rotates 180 degrees to bring tool holder K3 into the working position formerly occupied by tool holder K1. So long as one vacant location exists on magazine 58, any one of the tool holders may be exchanged for any of the others by the appropriate combination and repetition of the just-described steps. In the embodiment of FIG. 12 a tool holder magazine 59 is provided with the tool holders k1-k8. As with the other magazine embodiments of FIGS. 7 through 12, repositioning of the tool holders in the magazine can be equivalently coordinated and synchronized with the operation of the present inventive arrangement, through said NC controls.

In the embodiment of FIGS. 13-15 the parts which perform the same function are identified with the same reference numerals. In this embodiment a flexible multiple-spindle working unit is provided for working in Z-axis, whereas in the embodiments of FIGS. 16-18, a working in Y-axis and Z-axis is possible.

FIGS. 19-21 show an embodiment in which a working is possible in three axes, namely X-axis, Y-axis and Z-axis. In the embodiments of FIGS. 22-24 a working in X-axis and Z-axis is provided.

Figure 25:
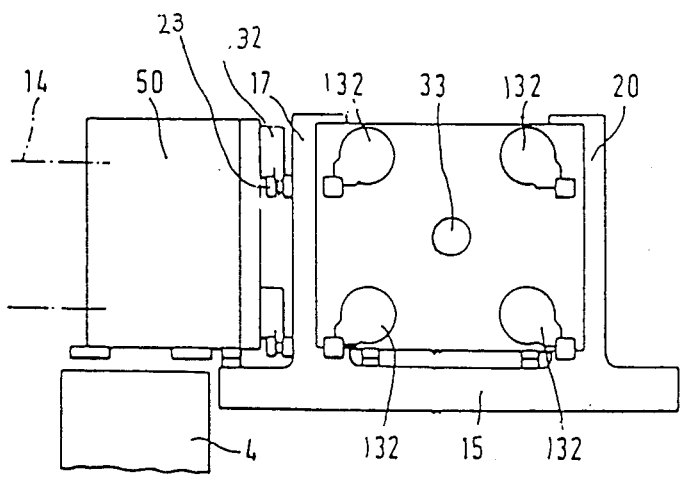
FIG. 25 is a side elevation of the exchange ring according to the invention, shown raised in the turning position.
Figure 26:
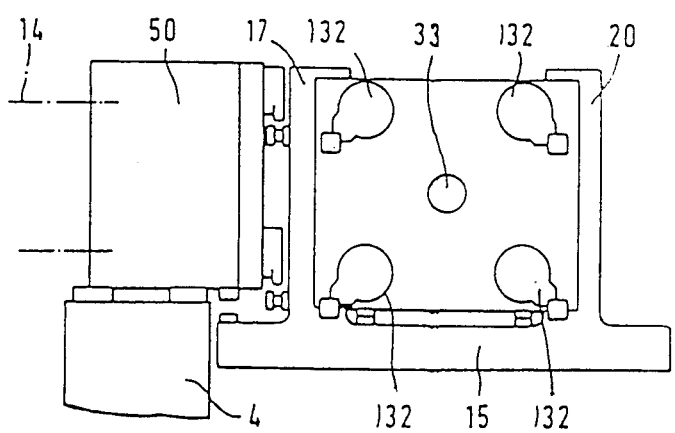
FIG. 26 is a side elevation to the invention, shown in a lowered position.

In FIG. 25, the exchange ring 15 is shown in lifted position with couplings, such as coupling 23, sliding under and into abutment 32 upon lifting to the turning position, whereas FIG. 26 shows the working position with lowered exchange ring 15 in which the front tool holder is coupled, fixed and tensioned on the drive unit 10 by clamping elements 34 through 37 in apertures 132, so that the work forces encountered during the various tool operations on workpieces are transmitted, not to the exchange ring and auxiliary carriage, but to the platen face 101 of drive unit 10.

It will be understood that each of the elements described above, or two or more together, may also find a useful application in other types of constructions differing from the types described above.

While the invention has been illustrated and described as embodied in a method of and arrangement for exchanging a tool holder in a working unit for working workpieces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for repositioning one or more tool holders from one or more non-working storage positions, respectively to a working position for working workpieces, in a tool holder arrangement including a carriage member reciprocatable between said working and non-working positions, a drive unit at a first end of said carriage member, and a rotatable exchange ring means operably positioned about said carriage member and drive unit, for rotation of said one or more tool holders thereabout, and capable of being moved in joint longitudinal reciprocating movement with said carriage member, said method for repositioning comprising the steps of:

moving said carriage member and said rotatable exchange ring means in a first reciprocating direction until said carriage member is proximate to said tool holder in one of said one or more non-working storage positions, said storage positions being remote to the drive unit at said first end of said carriage member;

coupling said tool holder at said non-working storage position to said rotatable exchange ring means;

rotating said rotatable exchange ring means relative to said carriage member so as to move said coupled tool holder to a position closely juxtaposed to said drive unit at said first end of said carriage member;

coupling, fixing and tensioning said tool holder to said drive unit for transmission of power to the tools borne by said tool holder;

repositioning said carriage member, drive unit and rotatable exchange ring means in a second reciprocating direction, substantially opposite to that of said first reciprocating direction, to said working position at which working position said tool holder may accomodate the working of workpieces;

uncoupling, after the working of workpieces, said tool holder from said coupled, fixed and tensioned position along said drive unit at said first end of said carriage member;

retracting said carriage member, said drive unit and said rotatable exchange ring means with said tool holder, from said working position by reciprocating same in said first reciprocating direction;

rotating said rotatable exchange ring means relative to said carriage member so as to move said tool holder coupled to said rotatable exchange ring means to a position closely juxtaposed to any one of said one or more non-working storage positions; and uncoupling and releasing said tool holder from said rotatable exchange ring means for engagement by and remote storage of said disengaged tool holder at one of said one or more non-working storage positions.

2. The method according to claim 1 in which said one or more tool holders comprise at least two tool holders; said operations of coupling a first one of said at least two tool holders to said rotatable exchange ring means at said non-working storage position and uncoupling a second one of said at least two tool holders from said drive unit at said first end of said carriage member occurring simultaneously to one another, said operations of coupling, fixing and tensioning said first one of said at least two tool holders to said drive unit and uncoupling and releasing from said rotatable exchange ring means said second one of said at least two tool holders at said non-working storage position also occurring simultaneously to one another.

3. The method according to claim 1 in which said operations of coupling said tool holder to said rotatable exchange ring means at said non-working storage position and uncoupling said tool holder from its coupled, fixed and tensioned position at said drive unit is accomplished by raising said rotatable exchange ring means, together with a series of exchange ring coupling members to an exchange height relative to the position of said carriage member, said operations of coupling, fixing and tensioning said tool holder to said drive unit and uncoupling and releasing said tool holder from said rotatable exchange ring for remote storage of said tool holder at said non-working storage position are accomplished by lowering said rotatable exchange ring means and said series of exchange ring coupling members to a working height, relative to the position of said carriage member.

4. The method according to claim 3 in which said raising of said rotatable exchange ring means to said exchange height is accomplished by reciprocating said rotatable exchange ring means, said carriage member and said drive unit to the limits of said first reciprocating direction toward said non-working storage position, said lowering of said rotatable exchange ring means to said working height being accomplished by said reciprocation of said rotatable exchange ring means, said carriage member and said drive unit in said second reciprocating direction toward said working position.

5. The method according to claim 4 in which said carriage member further includes a longitudinally movable auxiliary carriage means capable of being raised and lowered with said rotatable exchange ring means relative to said carriage member, said means for raising and lowering both said auxiliary carriage means and said rotatable exchange ring means including, at least one annular lever with at least one roller arranged under said rotatable exchange ring means and provided with a coupling rod associated with said carriage to which said longitudinally movable auxiliary carriage is connected, said roller being arranged to run in a control curve to an end position proximate said non-working storage position to raise said auxiliary carriage and said rotatable exchange ring means simultaneously when moved in said first direction and lowered upon movement of said carriage in said second opposite direction, wherein said auxiliary carriage is provided with shaped elements extending for at least a part of their length parallel to one another for the respective raising and lowering of same.

* * * * *

UNITED STATES PATENT AND TRADEMARK OFFICE
CERTIFICATE OF CORRECTION

PATENT NO. : 4,817,268

DATED : April 4, 1989

INVENTOR(S) : Hans-Ulrich Jaissle, et al.

It is certified that error appears in the above-identified patent and that said Letters Patent is hereby corrected as shown below:

| | |
|---|---|
| Col. 2, Line 37 | Delete "b" and insert instead -- be --. |
| Col. 4, Line 8 | Delete "with an extended non-rotatable" |
| Col. 4, Line 50 | After "elevation", insert -- of the exchange ring according --. |
| Col. 7, Line 13 | After "FIG.", insert -- 1 --. |

Signed and Sealed this

Twenty-fourth Day of October, 1989

Attest:

DONALD J. QUIGG

*Attesting Officer*  *Commissioner of Patents and Trademarks*